Oct. 5, 1954  F. BRÜNING ET AL  2,690,907
MACHINE FOR AUTOGENOUS CUTTING
Filed April 9, 1951  3 Sheets-Sheet 1
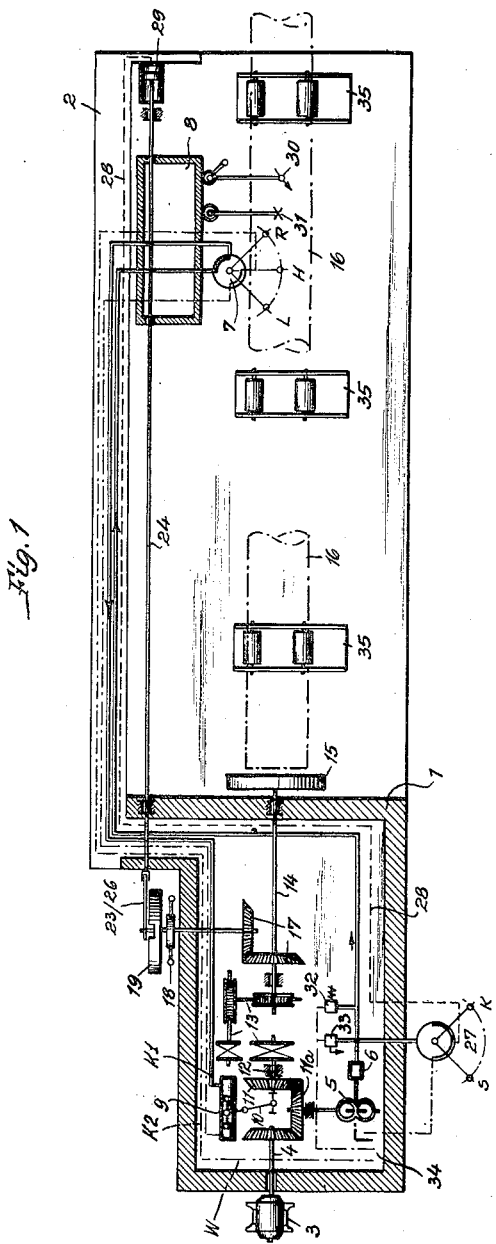
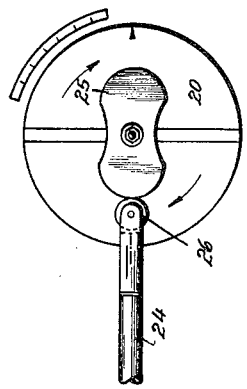
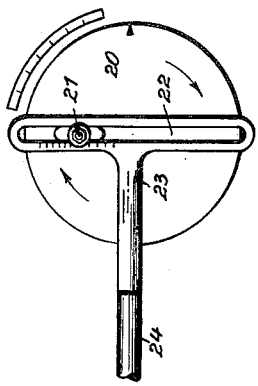
Inventors
Fritz Bruning,
Willi Veldgen,
Ernst Becker,
+ Ernst Billig (Deceased
by Else Billig,
Heiress)
By Watson, Cole, Grindle + Watson
Attorneys Oct. 5, 1954　　F. BRÜNING ET AL　　2,690,907
MACHINE FOR AUTOGENOUS CUTTING
Filed April 9, 1951　　3 Sheets-Sheet 2

Inventors
Fritz Bruning
Willi Jildgen,
Ernst Becker,
& Ernst Billig
(Deceased by
Else Billig,
(Heiress)
By
Watson, Cole, Grindle & Watson
Attorneys Oct. 5, 1954    F. BRÜNING ET AL    2,690,907
MACHINE FOR AUTOGENOUS CUTTING
Filed April 9, 1951    3 Sheets-Sheet 3
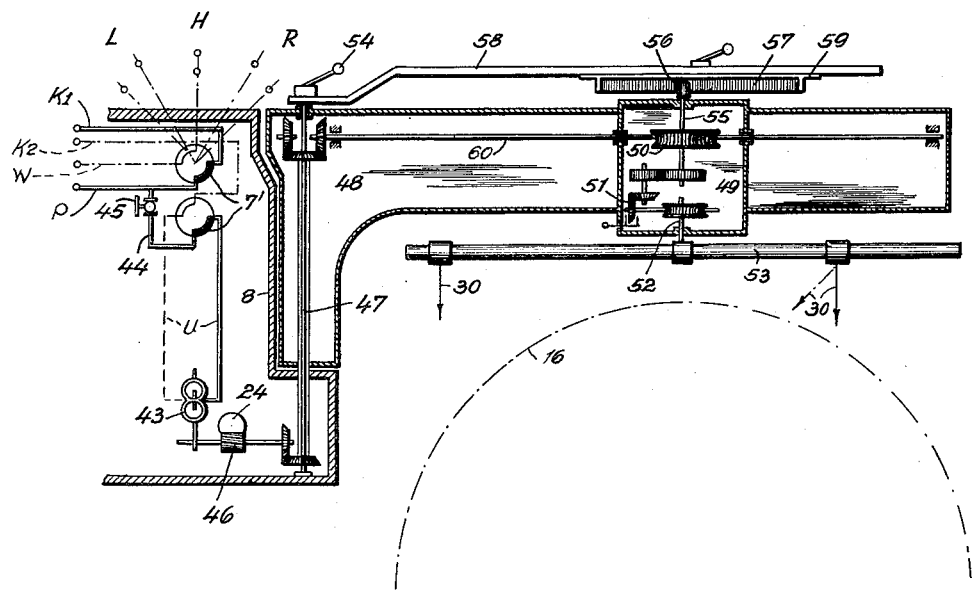
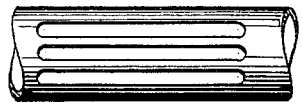 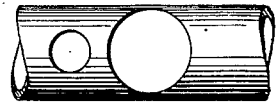
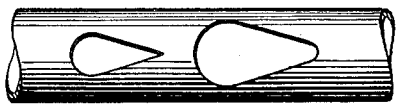
Inventors
Fritz Bruning,
Willi Veldgen,
Ernst Becker
+ Ernst Billig (Deceased)
by Else Billig,
(Heiress)
By Watson, Cole, Grindle & Watson
Attorneys Patented Oct. 5, 1954

2,690,907

UNITED STATES PATENT OFFICE 2,690,907

MACHINE FOR AUTOGENOUS CUTTING

Fritz Brüning, Gummersbach-Strombach, Willy Veldgen, Rospe, near Gummersbach, and Ernst Becker, Gummersbach, Germany, and Ernst Billig, deceased, late of Gummersbach, Germany, by Else Billig, heiress, Gummersbach, Germany, assignors to L. & C. Steinmuller, G. m. b. H., Gummersbach, Germany, a German company Application April 9, 1951, Serial No. 220,102

7 Claims. (Cl. 266—23)

The invention relates to certain improvements in machines for the autogenous cutting, more particularly of tubes, of the type in which the workpiece rotates about its longitudinal axis and the fusing unit is simultaneously moved to and fro in the longitudinal direction of the workpiece as well as of the type in which the tube stands still and only the fusing unit moves.

Single devices are known for the autogenous cutting of a wide variety of different workpieces. Thus, for instance, for plane work pieces in most instances devices are used which operate with a cross carriage or the like or which are designed in the form of detachable motor-driven fusing crabs. For working tubes, devices have been proposed in which the burner is moved to and fro in a direction parallel to the axis of the tube in dependence of the rotary motions of the tube. Other known devices have a movable ring for carrying the work piece and the burners are fixed on jointed arms and guided over the workpiece by hand. All devices hitherto known operate with a purely mechanical transmission, partly using guiding patterns or stencils. They have the disadvantage of being limited in their field of application because they are either intended only for predetermined dimensions of the workpieces or they are extremely large and complicated in use. This will be felt particularly in making more difficult cuts. Moreover the purely mechanical transmission in tube cutting has the drawback that the cutting surface owing to the axial movements of the workpiece and the non-uniform rotary motions therof, caused by the irregularities in the roundness of the workpiece, becomes inexact.

It is a special object of the invention to avoid these drawbacks.

Another object of the invention is to provide a machine having a wide range of application, an accurate and reliable method of working, a simple construction, and being easy to operate.

With these objects in view, one feature of our novel machine consists in inserting a controlling device between the driving means of the tube and the fusing unit and causing the connecting means connecting the controlling device with the fusing unit to make a to and fro movement.

According to another feature of the invention said controlling device comprises an eccentric disc having an adjustable sliding block and a rod connected with said block and being adapted to be coupled with the fusing unit and causing its to and fro movements.

According to still another feature of the invention said controlling device comprises an adjustable copying pattern coacting with a rod coupled with the fusing unit and causing its to and fro movement.

Another feature of the invention relates to the insertion of a disconnectable coupling between the said controlling device and the drive of the machine, said coupling being operated when a transition from normal cutting to copying cutting happens or for adjusting the controlling device.

It is further a feature of the invention to provide an independent drive for driving the fusing unit, said drive allowing to move the single adjustable elements of the fusing unit, such as the fusing carriage, the fusing arm, the fusing head and the rotatable fusing bridge.

The said independent drive consists, according to the invention, preferably of an oil motor.

If a copying pattern is used for moving the fusing unit according to a further feature of the invention a hydraulically controlled piston or the like is provided positively connecting the rod coupled with the fusing unit with the copying pattern.

With the mentioned devices the movements of the workpiece and/or of the burner unit may be effected by oil-operated or oleo-hydraulic devices, while the transmission proper is effected mechanically. It has been found that in this manner a high economy of the machine and a particularly neat operation thereof can be attained.

The hydraulic drive per se is known in the art. However, the use of a hydraulic control in working operations of the type to be carried out by the machines of the present invention represents a considerable advantage over the existing fusing machines, since it permits for the first time and in a very simple manner the accommodation in a small space of the individual units which normally are very complicated and voluminous, in the form of a multiple machine, in conjunction with a substantial simplification of the operation and supervision of the working process.

The combination of the oleo-hydraulic control with a mechanical transmission renders it possible to fuse faultlessly, e. g., tube sections or segments of configurations which are known as copying cuts. By applying to the control device a copying pattern or stencil in accordance with the desired configuration of the cut and by changing the transmission mechanism it becomes possible to fuse tube penetration cuts. Moreover, when cutting tubes with the machine, by properly adjusting the control device the cuts can be turned in any relatively displaced planes, so that the tube sections can be assembled to tube bends lying in different planes. The adjustment of the control device, which should go on easily and quickly, will be greatly facilitated by a clamping element which is provided according to a further feature of the invention.

The special advantage of the machine of the present invention resides in the fact that the neat and proper fuse-cutting no longer depends on the more or less accurate working of the operation, only one person being required for operating the machine, i. e. for supervising the burner or fusing unit from which the manipulations required in the fusing process are carried out.

The field of employment of machines for the autogenous cutting was restricted up to now generally to the working of tubes. The machine according to the invention, however allows a considerable extension of the field of employment by combining it with a so-called "groove planing machines" i. e. an apparatus allowing the forming of grooves in workpieces by means of an oxygen-jet.

According to a further feature of the invention the fusing unit is so constructed that the autogenous cutting device may be changed to a groove planing device.

Further objects and features of the present invention will be seen from the following detailed description in combination with the accompanying drawing showing by way of example and purely schematically one embodiment of the invention and in which:

Fig. 1 is a diagrammatic view showing the functional relations of the various parts of the machine, Fig. 2 is a detail of the machine.

Fig. 3 is another detail of the machine,

Figs. 5, 6, 8, 9 and 10 are plan views of various types of configurations which can be cut from tubes by the machine of the present invention, and Fig. 7 is another functional diagram of the machine.

Figure 4:
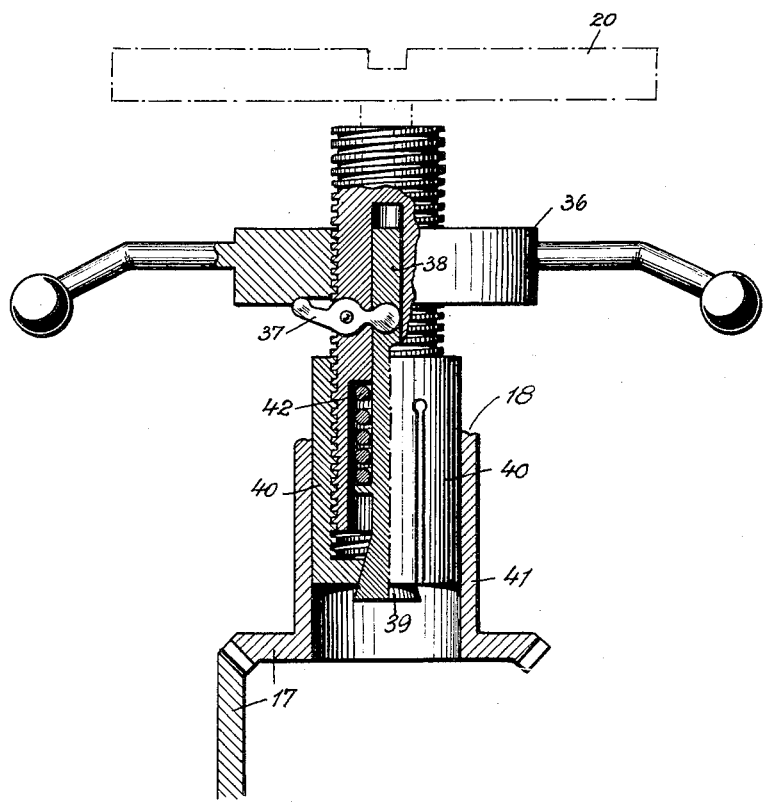
Fig. 4 is a side view, partly in section of the clamping element forming part of the machine.
Figure 5:
Figure 6:

Referring now to the drawing in greater detail, in which similar reference numerals denote similar parts, and first to Fig. 1, it will be seen that a circuit or functional diagram of the machine is drawn into the gear casing 1 and the frame 2 in such a manner that it can be seen which parts substantially are disposed outside of the gear casing 1 and the frame 2. The diagram shows a machine rotating in a clockwise direction. By switching in an electro-motor 3 the driving shaft 4 is set in motion with which the oil pressure pump 5 is coupled. The latter presses oil through a slit filter 6 to the change-over valve 7 provided at the fusing carriage 8 from which the oil is controlled in a manner depending on the position of the change-over valve 7. In case of machines with clockwise or right hand rotation the oil pressure acts upon the change-over piston 9 which through a rod gear 10 urges gear 11 into meshing contact with the bevel wheel reverse gear 11a. The rotation of the driving shaft 4 is thereby transmitted to the intermediate shaft 12. A change-speed gear 13 is provided to adjust the speed of rotation. The main shaft 14 thus adjustable in its speed and carrying the chuck 15 for holding the workpiece which also may be a hydraulic holding device, has a set of bevel wheels 17 which transmit the rotary motions of the main shaft 14 to a control device 19 with the aid of a clamping element 18 (Fig. 4). As shown in Fig. 2, this control device 19 is normally designed as a control disc 20 with an adjustable sliding block 21 which by means of a connecting piece 23 having a slot 22 which is straight or curved in accordance with the desired cutting curve transforms the rotary motions into reciprocating motions which are transmitted to the fusing carriage 8 by means of a rack 24. In order to carry out cuts of the type shown in Figs. 6, 9, and 10, the control disc 20 is converted into a copying disc, by applying a copying member 25 (Fig. 3), so that the rack 24 now acts as a rod of contact 26, which is substituted for the connecting member 23. In this case the change-over valve 27 in the gear housing 1 is set to its "copying cut" position ($k$), whereby the oil pressure is directed, through a pipe 28, behind a piston 29 provided at the end of the frame 2 and rigidly connected with the rack 24 or the rod of contact 26, respectively, thus urging the latter against the copying curve or cam 25. Since the fusing carriage 8 is also rigidly connected with the rack 24, the burner 30 provided on the fusing carriage 8 in its motions on the rotating workpiece 16 will carry out only the motions which are imparted to it by the copying member 25. In order to examine the correctness of the fusing line, e. g. in case of series cuts, the cutting line may be marked on the workpiece 16 with the aid of a swingable pointer or indicator 31, by a single trial run before the fusing, so as to permit faults in the fusing curve to be ascertained and to be prevented in time. In case of a left-hand run the machine operates in the same manner as hereinbefore described, with the respective changes as to the directions and sides. The connection of the pressure ducts between the stationary gear casing 1 and the frame 2 and the fusing carriage 8 moving to and fro on the latter is effected by flexible tube connections accommodated in frame 2. The oil pressure pipe is provided with a pressure governor 32 and on excess pressure valve 33 from which the oil fed in excess flows back into the oil basin 34 directly or through lubricating points. Adjustable roller bearings 35 are provided for carrying the workpieces 16 which may vary in their dimensions within wide limits, more particularly as to their lengths.

The clamping element 18 shown in Fig. 4, which is necessary when changing over from normal cuts to copying cuts, and when adjusting the control device 19 through degrees, so as to provide an easy and quick operation, operates in such a manner according to the invention that when clamping the coupling the clamping nut 36 transmits the clamping force through the lever 37 to the clamping bolt 38 which is formed at its front end with a conical enlargement 39. The spring chuck element 40, forced into tight engagement with the extension 41 of the hub of the bevel wheel by the conically thickened portion 39, is effective to provide a reliable transmission of the torque. When releasing the spring chuck element 40, the clamping bolt 38 is curved back by the helical spring 42 so that the torque-transmission is discontinued and changes can be made at the control device 19.

In order to cut configurations of the general nature as shown in Fig. 9, the regulation of the fusing speed is substantially facilitated by the provision of an appropriate gear in the fusing carriage 8 in such a way that the control device 19 and the main shaft 14 are operating in a predetermined speed ratio.

It is oftentimes required to make circular, slit-shaped and more difficult tube penetration cuts. Therefore, the machine of the present invention may be perfected so as to be enabled to make the cuts so far possible as well as the said additionally required configurations and even concave and convex cuts in solid material and, to the extent given by the size of the machine, even cuts in plane workpieces.

The machine thus perfected is the same as described above; only the fusing carriage is completed and provided with a separate drive which according to the invention does not work separately from the rest of the machine but advantageously is represented by an oil engine which can be inserted in the oil pipe, thus being driven by the oil pressure required for the control. This oil engine transmits its rotation selectively and adjustably to the fusing carriage itself as well as to the fusing arm, the fusing head and the fusing bridge.

If so constructed the movements of the fusing unit can be made independent of those of the main drive and therefore even stationary workpieces can be worked.

In the drawings Figure 7 is a sectional view of the fusing means.

A pipe $p$ leads from respectively the pump generating the oil pressure or a point of pressure system of the whole machine, a pipe K1 is connected to a piston 9 (Figure 1) controlling the sense of rotation of the main machine. A pipe K2 is leading back and another pipe W is connected to the oil basin 34 (Figure 1) or a similar receiver. A returning pipe or communication U is disposed between the double switch 7' and the oil motor 43.

The change-over on the fusing carriage 8 is designed in the form of a double switch 7', so that by changing it from position H (stop) over to position R (right) or mared position L (left) the oil pressure effective in the pressure system of the whole machine is led through the pipe 44, the double switch 7' and the pipe U to the oil motor 43, setting the same in rotation. The rotary motion is transmitted by a not shown gear set (enlarging the control range of the motor) to the fusing means. The oil motor is regulated by an adjustable nozzle 45 installed in the oil pipe 44. The fusing carriage 8 is moved along the work-piece in accordance with the required fusing speed or at a high speed by coupling the pinion 46 with the rack 24 connected to the machine. Simultaneously the torque of the oil motor 43 is transmitted to a connection shaft 47 and from the latter to a burner head 49 riding to and fro on a burner arm 48, as by a worm drive 50. A coupling 51 transmits the rotary motions through a spindle 52 to a fusing bridge 53 mounted on which one or more burners 30 may be adjustable.

When making cuts of the kind shown in Figure 8, i. e. longitudinal cuts, the pinion 46 is connected with the rack 24 and the coupling 51 in the fusing head 49 is disengaged, so that the fusing carriage 8 will be moved but the burner will stop. In order to carry out circular cuts, as shown in Figure 9, the driving pinion 46 for movements of the fusing carriage 8 is disengaged, so that the same comes to a stop and by engaging the coupling 51 only the fusing bridge rotates. During all these fusing operations the fusing head 49 is secured in one position to the fusing arm by a locking member (not shown). This may be done in that the worm of the worm drive 50 positioned on a shaft 60 and laterally displaceable is attachable to the shaft 60 preventing a laterally displacement. This locking member is disengaged only if for instance copying cuts should be carried out and therefore the fusing head 49 must be free movable along the fusing arm 48. Moreover, in this case the coupling 51 and a locking member 54, which so far kept the burner arm 48 in a position at right angles to the fusing carriage 8 is released, so that the burner arm 48 can be swung, whereby it is possible that the advantageously roughened copying roller 56 with a counter-roller on the spindle 55 of the fusing head is free to roll off on a copying pattern 57. Thus the copying pattern 57 is disposed between the copying roller 56 and the counter-rollers. This copying pattern is carried by an arm 58 which at the same time has been fixed at right angles to the fusing carriage 8 by releasing the locking member 54.

If the circular or similar cuts to be carried out are too large, so that in consequence of the varying distance between the fusing nozzle and the surface of the workpiece there exists the danger of not being successful in carrying out the fusing cut, it is quite possible to use burners which in a known manner lie with spacing rollers on the workpiece and which compensate the varying distance by sliding in their ways.

When fusing sheet metal or similar workpieces, the roller bearings 35 are moved together in such a way that they form a burner table with a satisfactory base. In order to fuse directly according to traced cutting lines or applied drawings the swingable pointer 31 may be used; it will be understood that the control in this case is by hand.

As already stated above the autogenous cutting device may be changed to a groove planing device.

It is already known to combine a groove planing device with a simple autogenous cutting and fusing machine for working workpieces with flat surfaces fastening the groove planing device on the fusing carriage of such cutting machines while the round workpiece to be planed is attached to a separate rotating apparatus. Compared with these known facts the invention has the special advantage that a machine is created having a very broad field of employment and, therefore, may be used in the practice in many different kinds. Thus, for example, the fusing or burning machine according to the invention may be used for the manufacture of bodies of milling cutters the working edges of which are to be provided with hard metal plates welded thereon. In such cases first grooves must be formed in the bodies, said grooves being provided with roundings. As in the burning machine according to the invention the speed of the fusing carriage may be regulated independently of the member of revolutions of the work piece, the machine combined with the groove planing device may be adapted for planing helical grooves without any additional devices and independent of the pitch of the helical lines. By this combination the possibilities to make use of the machine according to the invention are increased in such a degree that a considerable increase of economy happens.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having now particularly described and ascertained the nature of the invention and in what manner it is to be performed, we declare that what we claim is:

1. A machine for the gas cutting of articles comprising a frame, a fusing carriage movably supported on said frame, means for supporting said article to be cut in operable position with respect to said fusing carriage, means selectively operable to cause said fusing carriage to be moved longitudinally of said article, means for rotating said article, said article rotating means operably associated with said carriage and said article supporting means whereupon longitudinal movement of said carriage causes said article to rotate, an oil pump, said oil pump being drivingly connected to said selective carriage driving means, a burner mechanism supported on said fusing carriage including a rotatably supported burner said selective driving means including an oil motor supported on said fusing carriage, value means for selectively connecting the output of said oil pump to said oil motor and means drivingly connecting said oil motor and said rotatable burner mechanism.

2. A machine for gas cutting of articles as set forth in claim 1, wherein the burner mechanism comprises a burner arm mounted on said fusing carriage, a burner head mounted on said arm, a burner bridge rotatably mounted on said burner head, and at least one burner secured to said bridge.

3. A machine for gas cutting of articles as set forth in claim 2 wherein said means drivingly connecting said oil motor and said rotatable burner mechanism comprises a coupling, said coupling being disengageable for preventing said burner bridge from rotational movement relative to said burner head.

4. A machine for gas cutting of articles as set forth in claim 2, with means for mounting said burner head on said burner arm for longitudinal movement with respect thereto, a spindle mounted on said burner head, a templet arm mounted on said fusing carriage, a copying templet mounted on said arm, a copying roller mounted on said spindle for rollable engagement with said templet, a generally vertical shaft carried by said carriage, said burner and templet arms being mounted for swinging movement in a generally horizontal plane about said shaft, whereby the burners follow the path prescribed by the copying templet.

5. A machine for gas cutting articles as set forth in claim 4 with means for alternately locking said templet and burner arms whereby actuation of the lock in one direction locks the burner arm against movement with respect to the fusing carriage while allowing the templet arm to freely swing and actuation in a reverse direction locks the templet arm from movement relative to the fusing carriage, while allowing the burner arm to swing freely.

6. A machine for the gas cutting of articles as set forth in claim 1, and in addition thereto a regulating nozzle positioned between said oil pump and said oil motor for regulating the relative movement of the burner.

7. A machine for the gas cutting of articles as set forth in claim 1 in which said selective driving means includes a rack operatively connected to said fusing carriage, and means for selectively engaging said rack to impart longitudinal movement to said carriage.

References Cited in the file of this patent

UNITED STATES PATENTS

| Number | Name | Date |
|---|---|---|
| 1,661,274 | Steere et al. | Mar. 6, 1928 |
| 1,907,957 | Gerber | May 9, 1933 |
| 2,057,612 | Formont | Oct. 13, 1936 |
| 2,384,128 | Nation | Sept. 4, 1945 |
| 2,404,600 | Scovill, Jr. | July 23, 1945 |

FOREIGN PATENTS

| Number | Country | Date |
|---|---|---|
| 135,962 | Austria | Dec. 27, 1933 |
| 412,946 | Great Britain | July 4, 1934 |